(12) United States Patent
Metzger et al.

(10) Patent No.: US 12,151,958 B2
(45) Date of Patent: Nov. 26, 2024

(54) DESALINATION DEVICE ELECTRODE ACTIVATION

(71) Applicant: Robert Bosch GmbH, Stuttgart (DE)

(72) Inventors: Michael Metzger, Sunnyvale, CA (US); Soo Kim, Cambridge, MA (US); Saravanan Kuppan, Sunnyvale, CA (US); Sondra Hellstrom, East Palo Alto, CA (US); Christina Johnston, Sunnyvale, CA (US); Nathan Craig, Santa Clara, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 1084 days.

(21) Appl. No.: 16/535,588

(22) Filed: Aug. 8, 2019

(65) Prior Publication Data
US 2021/0039970 A1 Feb. 11, 2021

(51) Int. Cl.
*C02F 1/469* (2023.01)
*C02F 103/08* (2006.01)

(52) U.S. Cl.
CPC ........ *C02F 1/4691* (2013.01); *C02F 2103/08* (2013.01); *C02F 2201/46* (2013.01)

(58) Field of Classification Search
CPC .............. C02F 1/4691; C02F 1/46104; C02F 1/4604; C02F 2103/08; C02F 2201/46
See application file for complete search history.

(56) References Cited

U.S. PATENT DOCUMENTS

| | | | |
|---|---|---|---|
| 9,340,436 B2 | 5/2016 | Sahu et al. | |
| 2005/0227071 A1* | 10/2005 | Muraoka | H01M 14/005 |
| | | | 428/407 |
| 2014/0346046 A1* | 11/2014 | Andelman | C02F 1/4691 |
| | | | 204/674 |
| 2018/0065866 A1* | 3/2018 | Matani | B01D 69/02 |
| 2018/0148355 A1* | 5/2018 | Smith | B01D 61/422 |
| 2019/0047880 A1* | 2/2019 | Desai | C02F 1/4604 |
| 2019/0240623 A1* | 8/2019 | Beh | B01D 53/263 |
| 2020/0024159 A1* | 1/2020 | Parkey | H01M 8/188 |

(Continued)

OTHER PUBLICATIONS

Eugene S. Beh, Diana De Porcellinis, Rebecca L. Gracia, Kay T. Xia, Roy G. Gordon, and Michael J. Aziz, A Neutral pH Aqueous Organic—Organometallic Redox Flow Battery with Extremely High Capacity Retention, ACS Energy Letters 2017 2 (3), 639-644 (Year: 2017).*

(Continued)

*Primary Examiner* — Luan V Van
*Assistant Examiner* — Mofoluwaso S Jebutu
(74) *Attorney, Agent, or Firm* — BROOKS KUSHMAN P.C.

(57) ABSTRACT

A desalination battery includes a working intercalation electrode in a first compartment, a counter intercalation electrode in a second compartment, both compartments including saline water solution with an elevated concentration of dissolved salts, an ion exchange membrane arranged between the compartments, a voltage source arranged to supply voltage to the electrodes, and a sacrificial compound configured to neutralize charge within the first compartment at a predetermined voltage while being consumed by oxidation or reduction reactions upon an activation of the working electrode.

11 Claims, 4 Drawing Sheets

(56) References Cited

U.S. PATENT DOCUMENTS

2020/0058922 A1* 2/2020 Cohn ................. H01M 4/622

OTHER PUBLICATIONS

Mariyappan Sathiya, Joy Thomas, Dmitry Batuk, Vanessa Pimenta, Raghavan Gopalan, and Jean-Marie Tarascon, Dual Stabilization and Sacrificial Effect of Na2CO3 for Increasing Capacities of Na-Ion Cells Based on P2-NaxMO2 Electrodes, Chemistry of Materials 2017 29 (14), 5948-5956 (Year: 2017).*

Alexey M. Glushenkov and Amanda V. Ellis, Cell Configurations and Electrode Materials for Nonaqueous Sodium-Ion Capacitors: The Current State of the Field, Adv. Sustainable Syst. 2018, 2, 1800006 (Year: 2018).*

Jaehan Lee, Seonghwan Kim, and Jeyong Yoon, Rocking Chair Desalination Battery Based on Prussian Blue Electrodes, ACS Omega 2017 2 (4), 1653-1659 (Year: 2017).*

J. Deng, W.-B. Luo, S.-L. Chou, H.-K. Liu, S.-X. Dou, Sodium-Ion Batteries: From Academic Research to Practical Commercialization, Adv. Energy Mater. 2018, 8, 1701428. (Year: 2018).*

Jae Hyeon Jo et al., New Insight into Ethylenediaminetetraacetic Acid Tetrasodium Salt as a Sacrificing Sodium Ion Source for Sodium-Deficient Cathode Materials for Full Cells, ACS Applied Materials & Interfaces Jan. 17, 2019 11 (6), 5957-5965 (Year: 2019).*

Jaehan Lee et al, "Hybrid capacitive deionization to enhance the desalination performance of capacitive techniques,", Energy Environ. Sci., 2014, 7, 3683-3689, The Royal Society of Chemistry.

Kyle C. Smith et al., "Na-Ion Desalination (NID) Enabled by Na-Blocking Membranes and Symmetric Na-Intercalation: Porous-Electrode Modeling," Journal of The Electrochemical Society, 163 (3) A530-A539 (2016).

Seonghwan Kim et al., "Na2FeP2O7 as a Novel Material for Hybrid Capacitive Deionization," Electrochimica Acta 203 (2016) 265-271. journal homepage: www.elsevier.com/locate/electacta.

Jaehan Lee, "Rocking Chair Desalination Battery Based on Prussian Blue Electrodes," American Chemical Society, ACS Omega 2017, 2, 1653-1659. http://pubs.acs.org/journal/acsodf.

David Cohen-Tanugi et al., "Water Desalination across Nanoporous Graphene," ACS Publications, 2012 American Chemical Society, dx.doi.org/10.1021/nl3012853 | Nano Lett. 2012, 12, 3602, 3608.

David Cohen-Tanugi et al., "Quantifying the Potention of Ultra-Permeable Membranes for Water Desalination," Energy Environ. Sci., 2014, 7, 1134-1141. Royal Society of Chemistry.

K.-G. Zhou et al., "Electrically controlled water permeation through graphene oxide membranes,", Nature, 2018, 559, 2018. https://doi.org/10.1038/s41586-018-0292-y.

Ji Chen et al., "An improved Hummers method for eco-friendly synthesis of graphene oxide," Carbon 64 (2013) 225-229. www.sciencedirect.com.

William S. Hummers et al., "Preparation of Graphitic Oxide," J. Am. Chem. Soc., 1958, 6, 1339.

* cited by examiner

DESALINATION DEVICE ELECTRODE ACTIVATION

TECHNICAL FIELD

The disclosure is directed to desalination device electrode activation strategies and relates methods.

BACKGROUND

There is an ever-growing need for quality drinking water. Yet, sources of fresh water on land are limited, some are being depleted, and water quality of other sources is being compromised by a number of industrial and agricultural processes as well as expansion of cities. Thus, technologies are being developed to obtain fresh water from an abundant water source—sea and ocean water. But sea or saline water contains high concentrations of dissolved salt which renders the water unsuitable for human consumption, agricultural use, or industrial processes. Thus, the saline water requires further desalination to lower its concentration of dissolved solids before it can be utilized as drinking water.

Efforts to desalinate water date back thousands of years. For example, first recorded attempts include evaporation of salt water conducted by sailors at sea. The first large-scale modern desalination process, a multi-stage flesh distillation was developed during mid-$20^{th}$ century. Since then, a variety of desalination processes has been proposed and tested. Yet, common problems associated with these processes, which prevent a more widespread use of desalination, include high energy demands, environmental concerns, material issues related to corrosion of membranes, etc.

According to one embodiment, a desalination battery is disclosed. The desalination battery includes a working intercalation electrode in a first compartment, a counter intercalation electrode in a second compartment, both compartments including saline water solution with an elevated concentration of dissolved salts, an ion exchange membrane arranged between the compartments, and a sacrificial compound configured to neutralize charge within the first compartment at a predetermined voltage while being consumed by oxidation or reduction reactions upon an activation of the working electrode. The sacrificial compound may include one or more water-soluble redox molecules. The sacrificial compound may include one or more solid redox molecules configured as part of the working electrode body. The desalination battery also includes at least one vent structured to release activation reaction products. The desalination battery also includes one or more valves configured to bring the sacrificial compound to the first compartment. Prior to activation, one of the electrodes may include alkali metal such that the alkali-metal containing electrode holds ions at state of charge of less than about 50% prior to activation. The sacrificial compound may be water and the predetermined voltage may be below about 0 V. The sacrificial compound may have a higher reduction potential than the working electrode potential in a partially or fully intercalated state. The desalination battery also includes a reaction-products-formed protective layer on the working electrode, the counter electrode, or both to stabilize the electrodes during battery operation.

In an alternative embodiment, a method of activating a desalination battery working electrode is disclosed. The method includes providing a desalination battery including a working intercalation electrode and a counter intercalation electrode, each electrode arranged in a separate compartment including saline water solution with elevated concentration of dissolved salts. The battery also includes an ion exchange membrane arranged between the compartments. Prior to operation of the battery, the method includes supplying a predetermined voltage to a working electrode to either (a) de-intercalate ions from the electrode into a compartment such that the electrode's ion shuttling capacity increases or (b) intercalate ions to the electrode from a compartment to decrease an ion shuttling capacity of the electrode. The method includes reducing or oxidizing a sacrificial compound to neutralize charge in one of the compartments. The sacrificial compound may include one or more solid redox molecules configured as part of the working electrode body. The method may also include releasing one or more activation reaction products via at least one vent. The method may further include conveying the sacrificial compound to the compartment via at least one valve. The method may include increasing the ion shuttling capacity from pre-activation capacity of about 50% or less to about 100%. The method may further include adjusting pH in the compartment by adding a pH-adjusting medium to at least one of the compartments. The desalination battery may also include forming a protective layer on the working and/or counter electrode(s) to stabilize the electrode(s) for battery operation.

In yet another embodiment, a method of desalination battery activation of a battery having electrodes is disclosed. The battery includes achieving a state of charge balance electrode configuration of about 100%/0% by rebalancing an ion shuttling capacity of the electrodes, each electrode arranged in a separate compartment including a saline water solution, by applying a predetermined voltage to the electrodes to release ions from one or more of the electrodes to the solution or attract ions from the solution to one or more of the electrodes and providing at least one sacrificial compound to be reduced or oxidized while neutralizing charge created by the voltage application. The sacrificial compound may include one or more solid, soluble, or dissolved redox molecules. The method may also include releasing activation reaction products via at least one vent, and conveying the at least one sacrificial compound to the compartment via at least one valve, or both. The at least one sacrificial compound may have a higher reduction potential than the working electrode potential in its partially or fully intercalated state.

DETAILED DESCRIPTION

Figure 1:
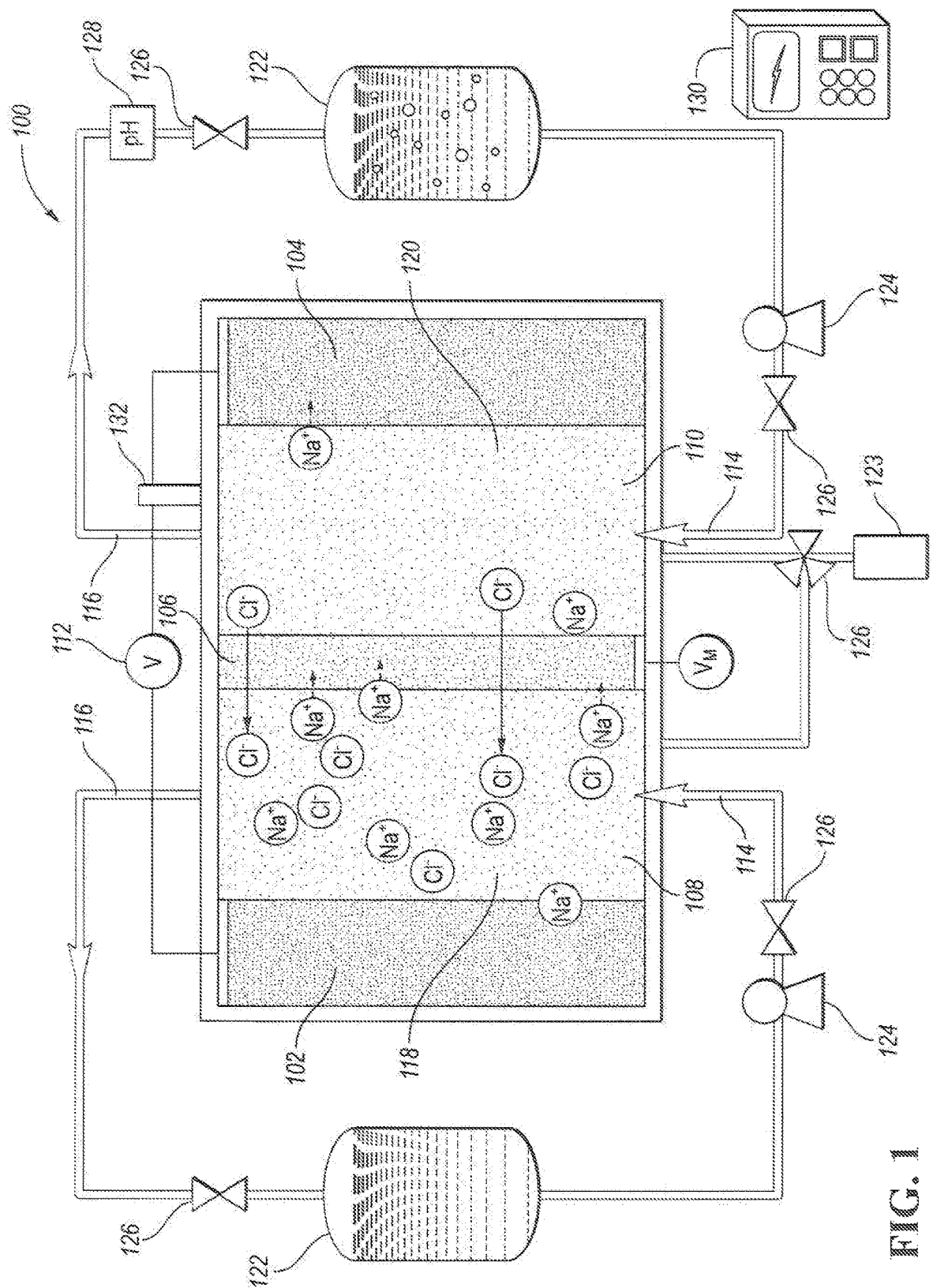
FIG. 1 depicts a schematic diagram of a non-limiting example desalination battery cell according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The Earth's increasing population has an ever-growing need for clean fresh water for consumption, agricultural, and industrial purposes. Fresh water refers to a water solution having a low salt concentration usually less than 1%. With the fresh water sources being limited, numerous attempts have been made to produce fresh water from abundant sea and ocean waters by desalination. Desalination is a process of removing mineral components from saline water. Removal of salt and other chemicals from the saline water requires electric or thermal energy to separate the saline water into two streams, a fresh water stream containing a low concentration of dissolved salts and a second stream of concentrated brine having a high concentration of dissolved salts.

Various desalination technologies have been developed, for example evaporation, freezing, distillation, reverse osmosis, ion exchange, electrodialysis, and the like. Yet, all of these technologies have certain drawbacks that prevent their wide-spread use and limit their success. For example, reverse osmosis typically requires a large input of electrical energy, which makes this technology quite expensive. Additionally, reverse osmosis utilizes selective membranes which are susceptible to fouling or unwanted accumulation of mineral deposits on the membrane surfaces. The membranes thus need frequent replacement which contributes to maintenance demands and increased cost.

Electrodialysis is another membrane desalination technology implementing ion exchange membranes. Electrodialysis may be costly and does not have a barrier effect against micro bacterial contamination. Yet, membrane-free technologies present other challenges. For example, freeze-thaw typically relies on extended periods of natural sub-zero temperatures and is therefore limited to certain climatic conditions. Multi-effect distillation utilizes several stages or effects during which feed water is heated by steam in tubes onto which saline water is being sprayed. But this technology presents high operating costs unless waste heat is available for the desalination process, and high temperatures may increase corrosion and scale formation.

Among the newly developed concepts are electrochemical approaches to desalination such as a desalination battery or an electrochemical device. Desalination batteries use an electric energy input to extract sodium and chloride ions, as well as other impurity ions from saline water to generate fresh water. The battery thus presents dual-ion electrochemical deionization technology, including sodium and chloride dual-ion electrochemical electrodes to which voltage is applied to bring about separation of saline water into fresh water having a relatively low concentration of dissolved salts and a concentrated brine stream.

It would be desirable to provide a water treatment system utilizing the desalination battery. A non-limiting example of a water treatment system utilizing a desalination battery may include a container to retain a liquid solution such as saline water or desalinated water, two electrodes, a power source, a saline water inlet, and a fresh water outlet. Additional components such as additional inlets, outlets, and the like are contemplated. The two electrodes may be separated by an exchange membrane. The exchange membrane may be either anion or cation exchange membrane. The exchange membrane may include a separator on either or both sides.

The container may be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, desalinated water, contaminated water, industrial water, etc. The container is spacious enough to house a sufficient amount of a water solution undergoing desalination; dimensions thus differ based on a specific application. The container may be large enough to serve industrial applications. The container may be made from different materials capable of withstanding corrosion, temperature fluctuations, changing pH, varying pressure, and be resistant to other chemical, mechanical, and/or physical conditions.

The container may be made from glass, plastic, composite, metal, ceramic, or a combination of materials. The container may feature one or more protective coatings. The container may be made from a material which minimizes occurrence of water contamination. The container may be made from material(s) which are nontoxic and comply with drinking water standards.

The electrodes are arranged within the battery to be in fluid communication with the water present in the container. The electrodes are at least partially submerged in the water solution. The electrodes may be fully submerged in the water solution. The electrodes may be placed on the opposite sides of a container, placed centrally in the container, or both be located on the same side of the container. The electrodes may be located next to each other or be separated by a distance with the presence of separator(s) and exchange membrane (either anion exchange membrane or cation exchange membrane). The distance may be 1 mm or more, 1 cm or more, 10 cm or more, 20 cm or more, 30 cm or more, depending on the dimensions of the battery module and stack systems, container, and electrodes.

The electrodes of the battery function as intercalation hosts. Intercalation refers to reversible inclusion of one or more ions into materials with layered structures. The spaces between layers may serve as a temporary storage for one or more types of ions. The first and second intercalation hosts reversibly store and release cations and anions from the saline water solution having a first concentration $c_1$ of dissolved salts to generate a fresh or desalinated water solution having a second concentration $c_2$ of dissolved salts and a brine solution having a third concentration $c_3$ of dissolved salts within the container such that $c_3>c_1>c_2$. Typically, $c_1$ may be between about 500 to 10,000, 800 to 7,000, or 1,000 to 5,000 ppm of dissolved salts, depending on the saline water source, $c_1$ related to an elevated concentration of dissolved salts in the saline water. The battery may reduce the amount of dissolved salts to $c_2$ of about 15 to 250, 30 to 150, or 50 to 100 ppm.

The electrodes may be made from the same or different material, depending on the operating condition and device design. The first, the second, or both electrodes may be made from expanded graphite. Graphite is a crystalline allotrope of carbon and is an example of a semimetal. Graphite presents the most stable form of carbon under standard conditions. Graphite is an electric conductor with highly anisotropic acoustic and thermal properties and is self-lubricating. Graphite has a layered, planar structure. Graphite's individual layers are called graphene. In each layer, the carbon atoms are configured in a honeycomb lattice with natural separation of 0.142 nm. The interlayer distance of pristine graphite is 0.335 or 0.34 nm. Individual atoms in the plane are bonded covalently, but bonding between graphene layers is provided via weak van der Waals bonds.

Thanks to its unique properties and structure, graphite has been used as an anode electrode material in Li-ion batteries. Yet, the applications typically involve pristine graphite. It is well-known that pristine graphite with its interlayer distance between the graphene layers in z-direction of 0.34 nm is not suitable for a different type of batteries, namely Na-ion batteries (NIB) because pristine graphite has a low capacity for $Na^+$ ions. Due to the relatively large size of $Na^+$ ions and steric effects, $Na^+$ generally has a weaker chemical bonding to pristine graphite than other elements present in the same column of the periodic table, that is other alkali metals. For example, $Na^+$ ions have larger radius than $Li^+$, which may hinder mass transport of $Na^+$ ions during electrochemical processes.

Thus, the electrode may include expanded graphite having an interlayer distance sufficient to accommodate $Na^+$ ions. The expanded graphite may be formed by modifying and/or expanding the interlayer distance of the pristine graphene layers. Different methods of expansion may result in an interlayer distance tailored for a specific application. When the graphene layers are expanded such that the expanded graphite interlayer distance is greater than 0.34 nm, specifically to 0.43 nm or more, $Na^+$ ions, and/or other ions, may reversibly insert into and extract from the expanded graphite, delivering a relatively high reversible capacity of $>\sim 280$ mAh/g at the current density of 10 mA/g. By using expanded graphite instead of pristine graphite, the sodium ion storage capacity may thus improve at least about 20 to 30 times.

The interlayer distance of the graphene layers may be tailored to provide sufficient storage capacity for a variety of anions, cations, or both. The interlayer spacing between the graphene layers may be significantly or substantially uniform. The interlayer spacing may be uniform along the entire length of the graphene layers, if well-controlled by the synthesis conditions.

The interlayer distance $d_s$ between the graphene layers in z-direction in the herein-disclosed expanded graphite may be greater than about 0.34 nm, 0.35 nm, 0.36 nm, 0.37 nm, 0.38 nm, 0.39 nm, 0.40 nm, 0.41 nm, 0.42 nm 0.43 nm, 0.44 nm, 0.45 nm, 0.46 nm, 0.47 nm, 0.48 nm, 0.49 nm, 0.50 nm, 0.51 nm, 0.52 nm, 0.53 nm, 0.54 nm, 0.55 nm, 0.56 nm, 0.57 nm, 0.58 nm, 0.60 nm, 0.61 nm, 0.62 nm, 0.63 nm, 0.64 nm, 0.65 nm, 0.66 nm, 0.67 nm, 0.68 nm, 0.69 nm, 0.70 nm or greater. The interlayer distance $d_s$ of the expanded graphite may be between about 0.37 and 0.45 nm, about 0.45 nm and 0.6 nm. The interlayer distance $d_s$ of the expanded graphite may be from about 0.37 to about 0.7 nm, about 0.43 to about 0.6 nm, or about 0.45 to about 0.55 nm. Different oxygen functional groups in the graphene sheets may assist with controlling the interlayer distance $d_s$. The oxygen functional groups may include groups such as —OH, =O, —O—, —COOH, the like, or a combination thereof. The groups may be prepared via solution-based approach and/or heat-treatment that may precisely control the interlayer distance $d_s$.

As a result of the expanded interlayer distance, expanded graphite can uptake cations and anions from saline water, seawater, brackish water, or the like. Expanded graphite can uptake cations including, but not limited to $Na^+$, $Mg^{2+}$, $Al^{3+}$, $Si^{4+}$, $K^+$, $Ca^+$, $Sc^{3+}$, $Ti^{2+/3+/4+}$, $V^{2+/3+/4+/5+}$, $Cr^{3+/6+}$, $Mn^{2+/3+/4+}$, $Fe^{2+/3+}$, $Ni^{2+/3+/4+}$, $Cu^{2+}$, $Zn^{2+}$, $Sn^{2+/4+}$, $Pb^{4+}$, etc. and anions including, but not limited to, single anion species such as $F^-$, $Cl^-$, $Br^-$, $I^-$, $S^{-/2-}$, anion complexes such as $ClO^{4-}$, $ClO^{3-}$, $ClO^{2-}$, $BrO_4^-$, $BrO_3^-$, $SO_4^{2-}$, $SiO_3^{2-}$, $CN^-$, metal-containing anions such as $MX_yO_z^{n-}$ (where M=Na, Mg, Al, Si, K, Ca, Sc, Ti, V, Cr, Mn, Fe, Ni, Cu Zn, Mo, Sn, Cs, and Pb; X=F, Cl, Br, I, N, and P; and $0<y\leq 5$; $0\leq z\leq 5$; $1\leq n\leq 4$), and the like.

The expanded interlayer distance of the expanded graphite allows even ions with a relatively large radius such as $Na^+$ to be drawn within the spaces defined by the graphene layers, temporarily remain therein, and be released later. The expanded graphite thus hosts one or more ions as guests. For example, the intercalation material may include one or more of the following active materials: $A_xCuFe(CN)_6$, where A=Li, Na, K, Cs and $0\leq x\leq 1$, $A_xMnFe(CN)_6$, where A=Li, Na, K, Cs and $0\leq x\leq 1$, $A_xMnMn(CN)_6$, where A=Li, Na, K, Cs and $0\leq x\leq 1$, $A_xZnFe(CN)_6$, where A=Li, Na, K, Cs and $0\leq x\leq 1$, $A_xBaFe(CN)_6$, where A=Li, Na, K, Cs and $0\leq x\leq 1$, $Ti_xFe_{1-x}[Fe(CN)_6]_{0.96}$, where $0\leq x\leq 1$, Polyimide (PNDIE), $FePO_4$, $NaMnFe_2(PO_4)_3$ Alluaudite, $Na_3Fe_3(PO_4)_4$, $Na(M)PO_4$, where M=Fe, Mn, or $Fe_xMn_{1-x}$ and $0\leq x\leq 1$, $MnO_2$, $Na_xMnO_2$, where $0\leq x\leq 1$, $ZnMn_2O_4$, $MgFeSiO_4/C$, $Mg_xMn_{2-x}SiO_4$, where $0\leq x\leq 2$, $Mg_{0.5}Ti_2(PO_4)_3$, $LiTi_2(PO_4)_3$, $Ti_xAl_{2-x}(PO_4)_3$, where $0\leq x\leq 2$, $TiP_2O_7$, $Na_3MnTi(PO_4)_3$, $K_2Ti_4O_9$, $TiS_2$, $FeS_2$, $CaMO_3$, where M=Mn and/or Fe, Potassium Terephthalate, 2,5-pyridinedicarboxylate ($K_2PC$), $KFeF_3$, $K_{0.3}MnO_2$, $KMg_xFe_{2-x}(PO_4)_2$, where $0\leq x\leq 2$, $A_xFeFe(CN)_6$, where A=Li, Na, K, Cs and $0\leq x\leq 1$, $A_xNiFe(CN)_6$, where A=Li, Na, K, Cs and $0\leq x\leq 1$, $NaTi_2(PO_4)_3$, $Na_2FeP_2O_7$, $TiO_2$, $Na_2Ti_3O_7$.

The cation intercalation active material may be doped or un-doped cubic spinel $MnO_2$, $Na_4Mn_9O_{18}$ (or equivalently, $Na_{0.44}MnO_2$) tunnel structured orthorhombic materials, $NaM_2(PO_4)_3$ (where M=Ti, Mn, Fe, Ni, Cu, or combinations thereof), where the exact composition of Na may be controlled by thoroughly mixing different starting amount of $Na_2CO_3$ or NaOH with metal oxide precursors, followed by the heat treatment at high temperature (about 800° C.). Partial substitution of Na in these structures with Li, Mg, Ca, and/or K is allowed.

Additionally, the cation intercalation material to be used as an electrode may include, but is not limited to, $Na_{0.44}Mn_2O_4$, $NaMnO_2$, $K_{0.27}MnO_2$, $Na_{2/3}Ni_{1/4}Mn_{3/4}O_2$, $\gamma$-$MnO_2$, $Na_3V_2(PO_4)_3$, $Na_2VTi(PO_4)_3$, $NaVPO_4F$, $Na_2V_6O_{10} \cdot xH_2O$, $Na_{0.66}[Mn_{0.66}Ti_{0.34}]O_2$, $MoO_3$, $Na_2FeP_2O_7$, $Na_3TiMn(PO_4)_3$, $Na_3V_2O_2(PO_4)_2F$, the like, or a combination thereof. The cation intercalation host material may include Prussian blue and/or Prussian blue analog—hexacyanoferrate (HCF) or hexacyanomanganate (HCM)-based compounds such as NiHCF, NiCuHCF, and MnHCM.

On the other hand, the intercalation material may be specialized for anions. The anion intercalation active material may include AgCl, $FeCl_3$, $C_3N_4$, FeOCl, BiOCl, VOCl, $Mg(ClO_2)_2 \cdot 6H_2O$, $MgCl_2O$, $NaClO_2 \cdot 3H_2O$, at least one of the following ternary and quaternary metal oxides and metal oxychlorides: $AlH_{12}(ClO_2)_3$, $MnH_8(ClO_2)_2$, $FeH_8(ClO_2)_2$, and $NiH_8(ClO_2)_2$, at least one of the following alkali-metal-based and transition-metal-based oxychlorides and their hydrates: $Ca_4Cl_6O$, CaHClO, $NaH_4ClO_2$, AlClO, $Si_3(Cl_4O)_2$, $SiCl_2O$, $Si_6Cl_{10}O_7$, $SiCl_2O$, $Si_2Cl_2O_3$, $Ti(ClO_4)_4$, TiClO, $Mn_8Cl_3O_{10}$, $MnH_4(ClO)_2$, FeClO, $Ni(ClO_4)_2$, $NiH_{16}(ClO_8)_2$, $NiHi_2(ClO_3)_2$, $Cu_2Cl_2O$, and $CuH_8(ClO_5)_2$, the like, or a combination thereof.

An example loading amount of the active material capable of intercalation may be about 0.01 to 100 mg/$cm^2$, 0.05 to 50 mg/$cm^2$, or 0.1 to 10 mg/$cm^2$ in the cathode, anode, or both.

Besides the active material, one of the electrodes or both may include one or more conductivity agents, one or more polymeric binders, and/or other components. The electrode(s) may include active material in the amount of about 70 to 99 wt. %, 75 to 97 wt. %, or 60 to 95 wt. %, based on the total weight of the electrode. The electrode(s) may include one or more conductivity agents in the amount of about 1 to 40 wt. %, 2.5 to 30 wt. %, or 5 to 20 wt. %, based on the total weight of the electrode. The electrode(s) may include one or more polymeric binders in the amount of about 1 to 30 wt. %, 2.5 to 20 wt. %, or 5 to 15 wt. %.

A non-limiting example of a conductivity agent may include carbon black, conductive carbon black, amorphous carbon, carbon fibers, quaternary ammonium salt(s), alkyl sulfonate(s), halogen-free cationic compound(s), the like, or a combination thereof.

A non-limiting example of a polymeric binder may be polyvinylidene fluoride (PVdF), polyacrylonitrile (PAN), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (PVdF-CTFE), poly(methyl methacrylate-vinyl acetate) (PMMA-VAc), poly(ethylene glycol) diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG), the like, or a combination thereof.

Additionally, the electrode(s) may include one or more pillaring agents. Pillaring agents or dopants refer to various compounds which may be incorporated within the structure of the electrode by chemical modification of the active material. For example, the pillaring agents may be chemically and/or mechanically bonded to the individual graphene layers of the expanded graphite. The one or more pillaring agents may be incorporated between adjacent graphene layers within the expanded graphite and/or configured to maintain a predetermined, specific interlayer spacing distance $d_s$ between the adjacent layers.

The pillaring agents may further enhance the mass transport and/or selectivity of ion adsorption and desorption processes in the battery. For example, incorporating sulfur as a pillaring agent may result in attracting a larger proportion of cations. Alternatively, modifying the electrode active material with positive metal or metal oxides may result in an increased attraction of anions while repelling cations. The pillaring agents may thus assist with adjusting chemistry of the fresh water solution to achieve a desirable chemical composition of drinking water. For example, in a region where the seawater to be desalinated contains an undesirable amount of anions and/or desirable amount of cations, a positive pillaring agent may be incorporated to attract the anions to be intercalated while leaving a greater amount of cations in the water solution. The fresh water solution may thus be tailored to the local needs and drinking water norms.

The electrodes may operate within the water stability window, about −0.5 to 1.5 V, −0.4 to 1.2 V, −0.3 to 1.1 V, or 0 to 0.9 V in comparison to standard hydrogen electrode (SHE) (or, 2.2 to 3.6 V vs. $Na/Na^+$) to store one or more of the above-mentioned types of ions, for neutral water at pH of about 7-8. Lower pH value can shift the voltage higher (up to +0.4 V at pH=0) and higher pH value can shift the voltage lower (up to −0.4 V at pH=14).

The actual storage capacity of ions in the electrodes may vary depending on the operating voltage conditions, concentration of ions present in the water solution, overall chemical composition of the water solution, acidity of the water solution, and ohmic or any other type of resistance within the battery device, etc. For example, the actual capacity of ions in the electrodes may differ based on location as seawaters in different parts of the world have varying ion concentrations.

The salt adsorption capacity of the electrodes may vary from about 1 to 300, 5 to 150, or 10 to 100 mg salt/g of active electrode materials. The electrode area may vary from about 10 to 500, 50 to 350, or 100 to 250 $cm^2$. The electrode thickness may vary from about 2.5 to 500, 5 to 400, or 10 to 300 μm, depending on the choice of electrode materials, porosity, tortuosity, viscosity of slurry containing the electrode materials, and the actual composition ratio of active material(s):binder:carbon. The porosity of electrodes may be about 20 to 80, 30 to 70, or 40 to 60%. The electrode density may vary from 0.1 to 5, 0.25 to 4, or 0.5 to 3 g/$cm^3$, depending on the particle size, microstructure, hardness of materials, as well as the amount of additive carbon in the electrode system.

The charge time for the battery for water cleaning may be from about 1 to 60 minutes, 5 to 45 minutes, or 15 to 30 minutes, depending on the capacity. The discharge time for electrode cleaning may take about 50 to 100% of the charge time, that is about 30 seconds to 60 minutes, 2.5 to 45 minutes, or 7.5 to 30 minutes. Typical flow rate during the charge process range may be about 0.5 to 5000 L/minute, 1 to 2500 L/minute, or 5 to 2000 L/minute, depending on a number of cells included in the battery module. The recovery rate of water may be greater than about 50, 55, 60, 65, 70, 75, 80, 85, 90, or 95%. The exact water flow rate may be controlled by the pumps as discussed below.

The electrodes may be separated by an exchange membrane. The exchange membrane may include a separator on either or both sides. The exchange membrane may be a cation or anion exchange membrane.

The exchange membrane may be an anion exchange membrane (AEM). The AEM may include graphene, graphene oxides, or both composed of hydroxyl-rich (—OH) oxygen functional groups. Specific functional groups such as hydroxyl (—OH), carboxylic (—COOH), carbonyl (=O), epoxy (—O), or a combination thereof, in graphene oxides allow adsorption and desorption of cations (i.e., $Na^+$, $K^+$, $Mg^{2+}$, $Ca^{2+}$, $Pb^{2+}$, etc.) at a relative stable voltage window such as 1.0 to 1.5 V or 0.401 to +1.23 V vs. SHE. In contrast, the anion absorption voltage is very high due to the electronic repulsion between the anion itself and graphene oxides oxygen functional groups (—OH, —COOH, =O, and —O—). Unless a very large voltage, greater than 3 V, is applied to the system, the anions such as $F^-$, $Cl^-$, $Br^-$, $I^-$, or $S^{2-}$, and anion complexes, including but not limited to, $ClO_4^-$, $ClO_3^-$, $ClO_2^-$, $BrO_4^-$, $BrO_3^-$, $SO_4^{2-}$, $SiO_3^{2-}$, or $CN^-$ freely move to the other side of the membrane because of the repulsion by the negatively-charged oxygen functional groups in the AEM materials. Thus, the functionalized graphene oxide layer may be used as a selective ion exchange membrane that only allows anions to pass.

The AEM may include a mixture of graphene oxides and other electronically conductive polymers including polyethylene oxide (PEO), poly(pyrrole)s (PPY), polyanilines (PANT), poly(thiophene)s (PT), poly(3,4-ethylenedioxythiophene) (PEDOT), poly(p-phenylene sulfide) (PPS), poly(acetylene)s (PAC), and poly(p-phenylene vinylene) (PPV), the like, or a combination thereof. In addition, the AEM may be composed of a mixture of graphene oxides and other polymers that are not electronically conductive but are ionically conductive including cross-linked poly-vinyl alcohol (PVA), cross-linked polymethylmethacrylate (PMMA), polyphenylene vinylene (PPV), the like, or a combination thereof. Additional electronically conductive material can be added as needed, such as graphite, hard carbon, soft carbon, carbon black, the like, or a combination thereof.

The battery or capacitive de-ionization device further contains a power source, current source, or voltage source capable of supplying electric current to the electrodes and/or the exchange membrane. The electric current is being applied to remove various ions from the water contained in the container. Applied voltage V and membrane voltage Vm may be used to control selective ion permeability and influence overall efficiency of the water desalination process. The electric current may be constant current until reaching a predetermined voltage cutoff or positive voltage may be applied to the battery. Cation entrapment and anion diffusivity through the exchange membrane may be enhanced by applying a controlled membrane voltage Vm. The membrane voltage may be about 0 to ±0.5 V.

A non-limiting example battery cell 100 for use in a water treatment device is depicted in FIG. 1. The battery 100 includes two electrodes 102 and 104 and an anion exchange membrane 106 placed between the electrodes 102, 104. The anion exchange membrane (AEM) 106 separates two independent water compartments 108, 110. The electrodes 102, 104 are connected to a voltage source 112. The battery cell 100 also includes one or more water inlets 114 and water outlets 116.

The inlets 114 and outlets 116 may be used to bring in or release saline or desalinated water. The number of inlets 114 and outlets 116 per compartment 108, 110 may be the same or different. For example, a first compartment 108 may have one more inlet than the second compartment 110. One or more inlets 114 may be located between the AEM 106 and the intercalation host 102, 104. An inlet 114, an outlet 116, or both may be located centrally between the AEM 106 and the host electrodes 102, 104. An inlet 114 may be located directly across from an outlet 116. Alternatively, an inlet 114 and an outlet 116 of the same compartment 108 or 110 may be staggered such that the inlet 114 and the outlet 116 are not aligned, are not placed on the same axis, are not located centrally between the AEM 106 and an electrode, or a combination thereof. The at least one inlet 114, outlet 116 or both may have the same or different diameter. An inlet 114, an outlet 116, or both may connect the battery 100 with the reservoir(s) 122, reservoir 123, additional reservoirs, or a combination thereof.

In addition, the battery cell 100 and additional battery cells disclosed herein may be connected to one or more water reservoirs 122 for storing saline or desalinated water, one or more pumps 124 capable of controlling water flow rate to and from the battery 100, valves 126 connected to the one or more pumps 124, and/or one or more devices 128 capable of checking, determining, or monitoring water quality such as a pH meter, water softener, etc. The reservoir 122 may be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, contaminated water, industrial water, etc. The pumps 124 may be automatic, manual, or both. The pumps 124 may be located in the inlet, outlet pipes, a stream connected to a water reservoir 122, or a combination thereof.

Alternatively or additionally, a post-treatment step may be carried out to further neutralize and/or adjust the water as required by a specific application.

The battery cell 100 may include two symmetrical electrodes 102, 104 including the same or similar chemistry and loading of the electrode material. Alternatively, the battery 100 may feature an asymmetric electrode configuration such that a first electrode 104 is made at least partially or entirely from a different material than the second electrode 106, the first electrode 104 has a different loading of the same or different material than the second electrode 106, or a combination thereof. The electrode materials may share similar structural characteristics such as same space group, but the concentration of ions such as $Na^+$, $Ca^+$, or $Mg^+$ may differ. In a non-limiting example embodiment, one of the electrodes may be made from chemically delithiated intercalation host material, e.g., $Na_xMnO_2$ with $x < x_{max}$, where the starting concentration of alkali metal within the alkali metal oxide is denoted by x. A non-limiting example of asymmetric electrodes may include one electrode including $FeFe(CN)_6$ and the second electrode including $NiFe(CN)_6$.

Once activated, the battery cell 100 may be operated in the following manner. A positive voltage V may be applied to the battery cell 100 to release cations such as $Na^+$ from one of the electrodes 102, 104. The cations are dispersed with the saline water in one of the water compartments 108, 110, specifically the brine compartment 118 including the saline water solution having a first concentration $c_1$ of dissolved salts. The saline water in the brine compartment 118 may be supplied through one of the water inlets 114. As cations cannot travel through the anion exchange membrane 106, the concentration of $Na^+$ in the brine compartment 118 increases. Anions such as $Cl^-$ become attracted and travel through the anion exchange membrane 106 to neutralize the cations in the brine compartment 118. At the same time, cations such as $Na^+$ ions intercalate into the other side of the electrodes 102, 104 due to charge neutrality and the applied voltage bias. This process creates a clean water compartment 120 including a fresh or desalinated water solution having a second concentration $c_2$ of dissolved salts on the opposite side of the anion exchange membrane 106 such that $c_1 > c_2$.

The battery 100 may be a closed or open system. The battery 100 may operate in cycles (intercalation and de-intercalation), where the water flows continuously. Under the continuous flow, the desalinated water from the clean water compartment 120 may be stored in a reservoir 122. Alternatively, the battery 100 may operate as a batch desalination device, where a limited amount of water may be supplied to a compartment to be cleaned in a smaller scale operation. Alternatively, or in addition, a semi-continuous flow of water may be supplied to the battery cell 108, 100 such that the water compartments 108, 100 may be refilled with additional saline water and may operate in the reverse direction in the next cycle. In an alternative embodiment, the battery cell 100 may be designed as a cylindrical tubular cell. Both compartments 108, 100 may be used for water purification in reverse operating direction.

Figure 2:
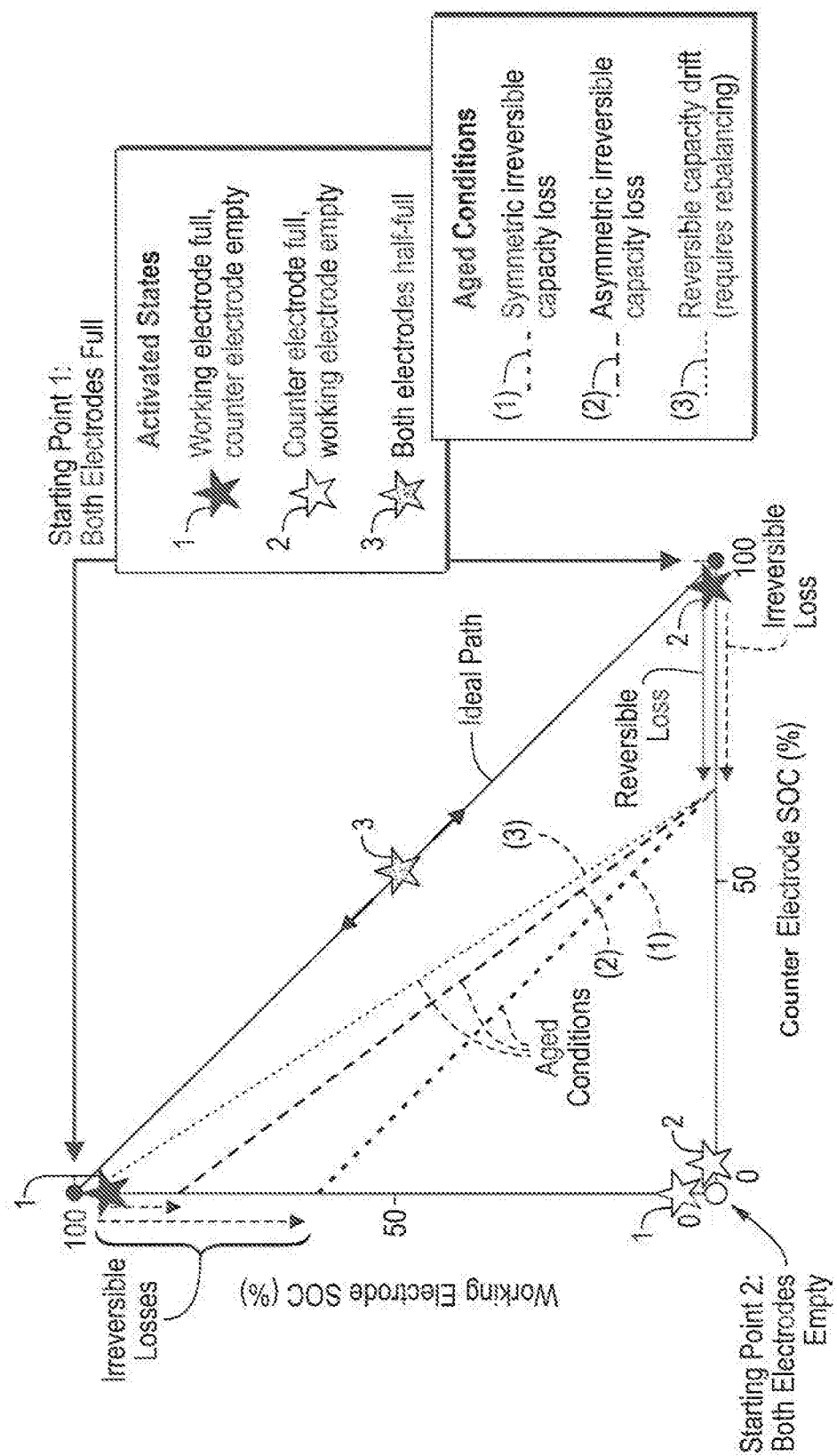
FIG. 2 schematically depicts an electrode balancing plot at various shuttling capacities.

In a non-limiting example, a continuous collection of clean water in successive cycles may be provided by utilizing a clean water reservoir 122 and a recycling loop for water purification. During the start-up, two electrodes 102, 104 are at similar state-of-charge (SOC) (for example 50%), then the first electrode 102 is discharged (toward 0%) and the second electrode 104 is charged toward 100% SOC. The process is schematically depicted in FIG. 2 (activated state 3). In the first cycle, the first target ions including $Na^+$, $K^+$, $Mg^+$, $Ca^+$, and $Pb^+$, and the like may be removed from the electrodes 102, 104 including the intercalation host material. Anions are added to the brine compartment 118 due to the cation-anion attraction (neutrality). The clean water compartment 120 thus contains desalinated water that may be collected. The next cycle allows to flush ions out of the electrodes 102, 104, expelling waste water. The electrodes 102, 104 may also be available for the next water purification cycle.

The desalinated water may be cycled in the battery 100 one or more times to further purify the water to reach a predetermined concentration $c_x$ of dissolves salts such that $c_x > c_2$.

The battery 100 and its electrodes 102, 104 are activated. The two electrodes 102, 104 can either be partially or completely filled with alkali metal ($x > x_{min}$) or partially or completely free of alkali metal ($x < x_{max}$) prior to operation. The activation process enables the battery 100 to effectively utilize the rocking chair concept such that charge carriers are shuttling back and forth between the two intercalating electrodes 102, 104. The activation may be accomplished by a variety of ways as disclosed herein.

The activation goal may be achieved when one electrode is completely filled with alkali metal, or at 100% capacity, and the other electrode is completely free of alkali metal or at 0% capacity (activated states 1 and 2 in FIG. 2). An alternative configuration may be both electrodes are 50% full of alkali metal or at 50% capacity such that the state of charge (SOC) balance between the electrodes is at 50%/50% (activated state 3 in FIG. 2). While the 0%/100% balance configuration may be more practicable and easier to control, other configurations are contemplated.

FIG. 2 illustrates a plot of electrode balancing between the working electrode SOC and counter electrode SOC. As can be seen, FIG. 2 illustrates the ideal balancing path for ion insertion and removal during cycling with no capacity losses. FIG. 2 shows electrode balancing before activation (starting points 1 and 2, dots), after activation (stars), and in aged conditions (dashed lines for irreversible conditions, dotted lines for a reversible condition).

The activation process should not result in any mechanical, thermal, or chemical harm to the electrodes, the battery or any of its components. For example, the activation process should avoid processes which would be detrimental to the battery in any way such as carbon oxidation when carbon electrodes are used.

The concentration of alkali metal may be either controlled chemically such as from synthesis or a pre-leaching process or electrochemically such as by insertion or de-insertion of ions, or both. The activation process may thus be achieved by one or more ways or strategies disclosed herein or their combination. The following activation strategies are thus disclosed herein: (1) addition/utilization of at least one or more redox sacrificial compounds providing the following activation strategies: (a) water oxidation/reduction, (b) addition of at least one or one or more soluble redox molecules to a water stream that get sacrificially oxidized/reduced when a certain voltage is applied to avoid water redox and corrosion of electrodes, (c) addition of at least one or one or more soluble redox molecules to a water stream that undergo oxidation/reduction when in contact with intercalated or de-intercalated electrode(s), (d) addition of at least one or one or more solid redox molecules to an electrode that get sacrificially oxidized/reduced when a certain voltage is applied, or (e) addition of at least one or one or more redox molecules/solid compounds that form desirable interface with the intercalation electrodes through their solid, liquid, or gaseous decomposition products. (a) may not require an addition of a sacrificial compound as water may be used as the sacrificial compound.

Further, the activation strategies may include (2) an operating strategy that controls the activation process via a set of valves to bring in the one or more sacrificial compounds and/or flush out reaction products, (3) providing at least one vent that releases gas generated from oxidation/reduction processes, (4) pH adjustments, maintenance, and control during the activation step to facilitate oxidation/reduction reactions, (5) a rebalancing strategy of the capacities during device lifetime to compensate for drift in electrode capacities, and/or (6) providing chemically delithiated electrodes during manufacturing prior to inclusion of the electrodes in the battery or electrochemical water cleaning device described herein.

The desalination operation may be started when one or both electrodes are partially or completely filled with alkali metal. In such scenario, the working electrode has pre-activation ion shuttling capacity lower than about 50%, 40%, 30%, 20%, 10%, or 5%, meaning that less than about 50%, 40%, 30%, 20%, 10%, or 5% of the host lattice is open to accept ions shuttled during intercalation or that the electrode holds ions at SOC of less than about 50%, 40%, 30%, 20%, 10%, or 5%. The post-activation shuttling capacity may be between about 50% and 100%, the post-activation shuttling capacity may be about 50, 60, 70, 80, 90, or 100%, based on the total shuttling capacity of the working or host electrode.

To start the water desalination operation when one or both electrodes, the working electrode alone or the working electrode and the counter electrode, are partially or completely filled with alkali metal, the working electrode is de-intercalated of ions by applying a voltage or current that leads to removal of ions from the host structure such as $NaMnO_2$. The de-intercalation results in the host electrode's increase of shuttling capacity as the host now has more open spaces to accept ions during intercalation.

To compensate the positive charge in the working electrode compartment created by ion removal from the electrode such as $Na^+$, a sacrificial compound A may be introduced. The sacrificial compound gets reduced in the counter electrode compartment. For every anion generated by sacrificial reduction, an anion such as $Cl^-$ ion, has to cross the AEM and balance a de-intercalated cation such as $Na^+$. The process is schematically depicted in FIG. 3.

Figure 3:
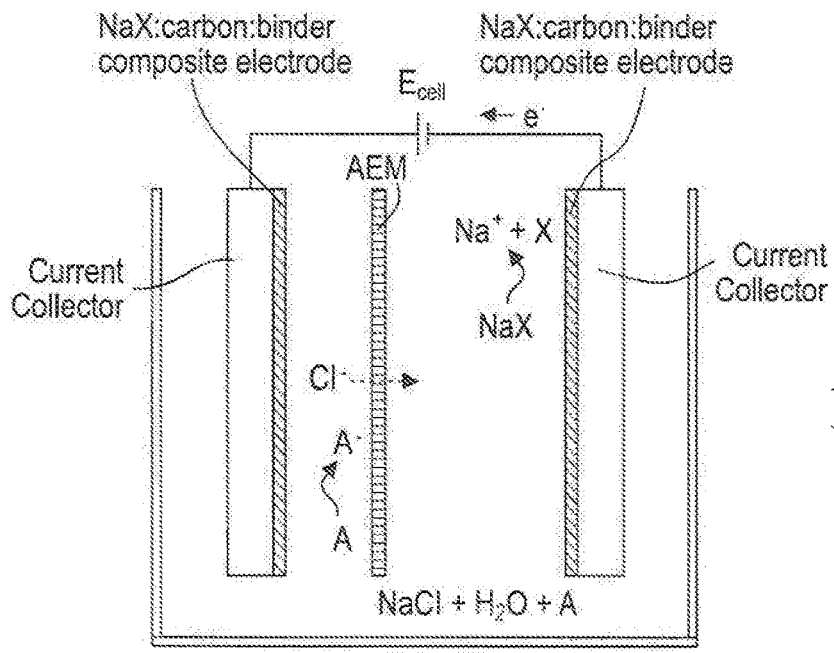
FIGS. 3-6 schematically depict principles of electrode activation using one or more sacrificial compounds A.

FIG. 3 shows an example system with two symmetrical electrodes, which may be, for example a NaX:carbon:binder composite electrode, where X is an electrode active material. A specific example may be graphite plus $NaMnO_2$:Super P:PVDF in a ratio of 80:10:10 such that X is $MnO_2$. The electrodes' composition may be different as the electrodes may contain other materials described herein.

As can be seen, FIG. 3 depicts a schematic activation process when both intercalation electrodes contain ions at the beginning of the device/system operation, that is NaX ($0<x\leq1$). The working electrode is de-intercalated by applying a voltage or current that leads to removal of ions from the host structure NaX such as $Na_xMnO_2$. To compensate the positive charge in the working electrode compartment created by ion removal from the electrode, for example $Na^+$, the sacrificial compound A gets reduced in the counter electrode compartment. For every anion generated by sacrificial reduction, $Cl^-$ has to cross the AEM and balance a de-intercalated ion such as $Na^+$.

The compound A for sacrificial reduction may be $H_2O$ reduced via $H_2O+e^-\rightarrow OH^-+\frac{1}{2}H_2$ at ~0 V vs. SHE. When the sacrificial compound is water, the goal is to purposely use voltage outside of the water electrochemical window or water window, which indicates a voltage range between which the substance is neither oxidized nor reduced. Typically in an electrode, voltage is kept within the water window as out of the water window range, water gets electrolyzed resulting in waste of electrical energy intended for another electrochemical reaction. Pure water electrochemical window is between 0 and 1.23 V. Yet, when water is used as a sacrificial compound described herein, voltage outside of the stability window such as voltage below about 0 V is used intentionally and results in reduction of water and generation of anions.

Instead of pure water, the sacrificial compound may include a variety of soluble species in a form of a salt or a solution, which may be added to water. The soluble species may be acids such as methanesulfonic acid $CH_4O_3S$ reduced at ~−0.6 V, butyric acid $CH_3(CH_2)_2COOH$ reduced to butyraldehyde at ~−0.3 V, the like, or combinations thereof.

Alternatively or additionally, a redox sacrificial compound or the compound A for sacrificial reduction may be a solid that is blended into the electrode slurry when making the electrode. Example solid species may be lithium salts or their sodiated analogs such as lithium bis(oxalato)borate $LiB(C_2O_4)_2$ reduced at ~1 V or sodium bis(oxalato)borate $NaB(C_2O_4)_2$ reduced at ~1 V. Lithium and sodium may be partially substituted by other alkali metals and alkali earth metals including K, Mg, Ca, the like, or their combination.

Figure 4:
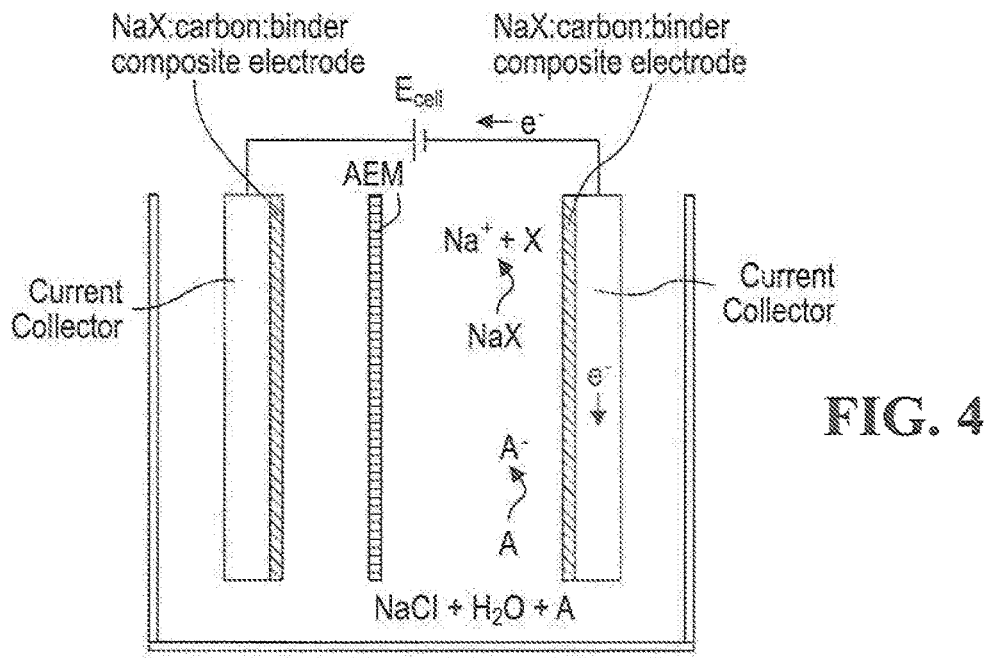

The sacrificial compound A may have a higher reduction potential than the electrode potential in its fully or partially intercalated state. The sacrificial compound A gets readily reduced at the potential of the working electrode. To compensate for the generation of the negative charge, $A^-$, a positive ion from the working electrode such as $Na^+$ is de-intercalated and the electrode potential changes accordingly. As a result, anions such as $Cl^-$ ions, do not have to cross the AEM since charge neutrality is maintained as is schematically illustrated in FIG. 4.

The sacrificial compound A for reduction may be one or more relatively small redox molecules that are added to the water stream. Example compounds include quinone reduced via $Q+2H^++2e^-\rightarrow QH_2$ at an equilibrium voltage of 0.15 V vs. SHE, formic acid HCOOH reduced at ~0.1 V, acetic acid $CH_3COOH$ reduced at ~0.03 V, propionic acid $CH_3CH_2COOH$ reduced at ~0.07 V, butyric acid $CH_3(CH_2)_2COOH$ reduced to butanol at ~0.08 V, the like, or their combination.

The desalination operation may be started when one or both electrodes, the working electrode alone or the working electrode and the counter electrode, are partially or completely free of alkali metal. In such scenario, the working or host electrode has pre-activation ion shuttling capacity higher than about 50%, meaning that more than about 50%, 60%, 70%, 80%, 90%, or 100% of the host lattice is open to accept ions shuttled during intercalation or that the electrode holds ions at SOC of more than about 50%, 60%, 70%, 80%, 90%, or 100%. The post-activation shuttling capacity may be between about 0 and 50%, the shuttling capacity may be about 5%, 10%, 20%, 30%, 40%, or 50% based on the total shuttling capacity of the electrode.

Figure 5:
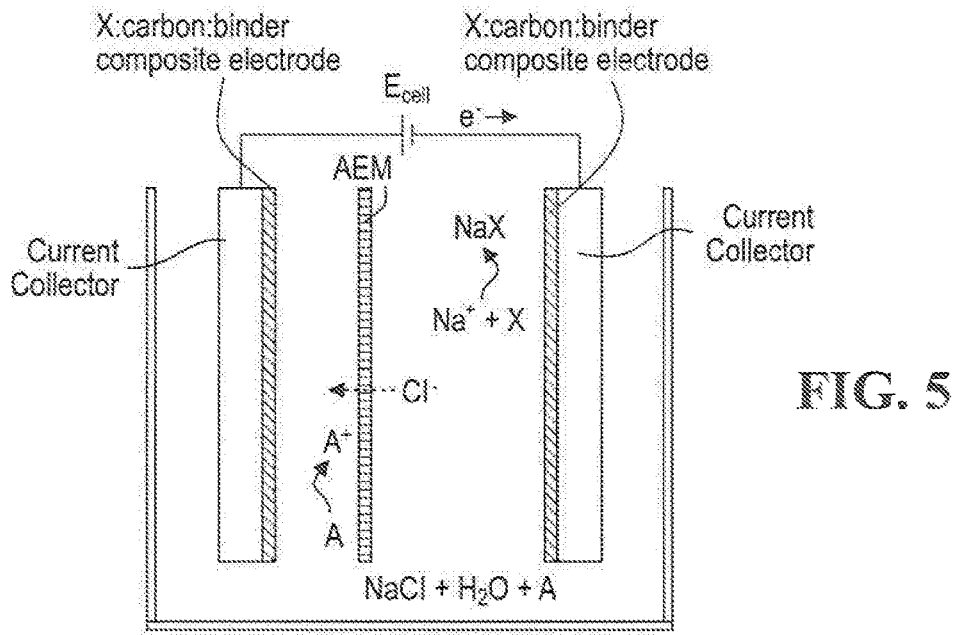

To start the water desalination operation when both electrodes are partially or completely free of alkali metal, the working electrode is intercalated with ions from water by applying a voltage or current that leads to insertion of ions into the host structure such X:carbon:binder composite electrode, where X is an electrode active material. A non-limiting example of X may be $FeFe(CN)_6$. To compensate for the removal of positive charge from the working electrode compartment such as $Na^+$, a sacrificial compound A gets oxidized in the counter electrode compartment. For every $Na^+$ intercalated, an anion such as $Cl^-$ has to cross the AEM and balance cation generated by sacrificial oxidation ($A^+$). The system is schematically depicted in FIG. 5.

The redox sacrificial compound or compound A for sacrificial oxidation may be $H_2O$ oxidized via $2H_2O\rightarrow O_2+4H^++4e^-$ at ~1.0 V vs. SHE. The sacrificial oxidation compound may alternatively be a variety of soluble species that are added to water. The soluble species may be organic compounds such as ethylene glycol $C_2H_6O_2$ with an equilibrium voltage around 0.5 V vs. SHE.

The redox compound A for sacrificial oxidation may be a solid that is blended into the electrode slurry when making the electrode. The solid species may be inorganic or organic lithium species or their sodiated analogs such as lithium azide $LiN_3$ with an equilibrium voltage around 0.3 V, or its equivalent sodium azide $NaN_3$, lithium carbonate $Li_2CO_3$ oxidized at ~1.3 V, sodium carbonate $Na_2CO_3$ oxidized at ~1.3 V, oxocarbons such as $Li_2C_4O_4$ oxidized at ~0.7 V, dicarboxylic acids, e.g., $Li_2C_3O_5$ oxidized at ~1.2 V, $Li_2C_4O_6$ oxidized at ~1.3 V, $Li_2C_2O_4$ oxidized at ~1.6 V, hydrazides $[COCON(Li)N(Li)]_n$ oxidized at ~0.1 V, the like, or their combination.

Figure 6:
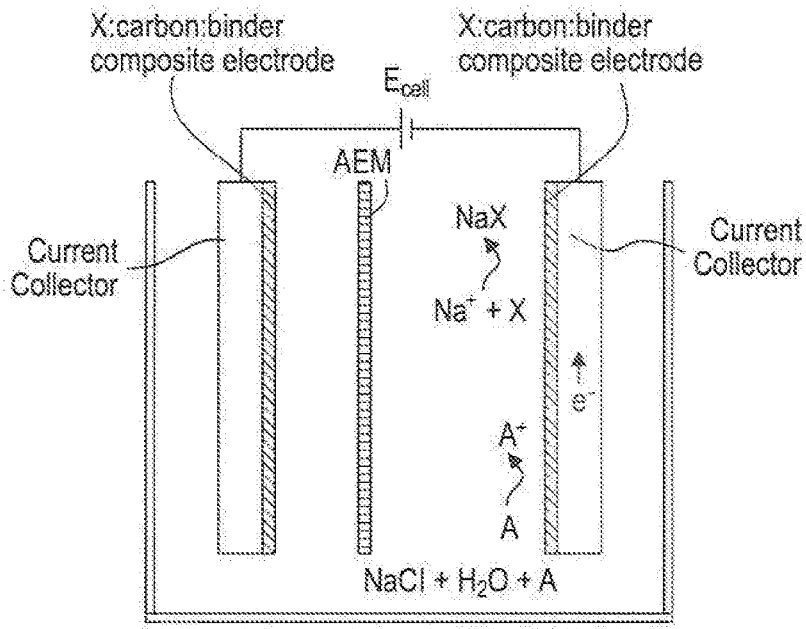

The sacrificial compound A may have a lower oxidation potential than the electrode potential in its fully or partially de-intercalated state. In such case, the sacrificial compound A gets readily oxidized at the potential of the working electrode. To compensate for the generation of the positive charge, $A^+$, a positive ion from solution such as $Na^+$, is intercalated into the working electrode and the electrode potential changes accordingly. Anions such as $Cl^-$ ions do not have to cross the AEM since charge neutrality is maintained as is schematically depicted in FIG. 6.

The sacrificial compound A may be one or more small redox molecules added to the water stream such as hydroquinone oxidized via $QH_2 \rightarrow Q+2H^++2e^-$ at an equilibrium voltage of 0.15 V vs. SHE. Other examples of sacrificial redox molecules are metallocenes (e.g., ferrocene), halogens (e.g., $I^-/I^{3-}$), and aromatic molecules (e.g., tetramethylphenylenediamine). Some non-limiting examples of specific materials within the foregoing classes which are suitable for use with an equilibrium voltage between −0.1 and 1.5 V vs. SHE include ferrocene which has an equilibrium voltage between 0.05 to 0.38 V, n-butylferrocene which has an equilibrium voltage between 0.18 to 0.5 V, N,N-dimethylaminomethylferrocene which has an equilibrium voltage between 0.13 to 0.68 V, 1,1-dimethylferrocene which has an equilibrium voltage between 0.06 to 0.34 V, 1,2,4-triazole, sodium salt (NaTAZ) which has an equilibrium voltage of 0.1 V, and lithium squarate which has an equilibrium voltage of about 0.1 V.

The one or more sacrificial compounds may be gas, liquid, gel, or solid. If the compounds are gas or liquid, the compounds may be dosed in the water stream for an easy application. If the compounds are solid or gel, the compounds may be included in the electrode slurry during manufacturing or added to the water stream as was described above. At least some of the species of the sacrificial compound may be soluble. Some of the species may be insoluble.

The redox species for the activation step may be chosen according to the products formed upon their sacrificial oxidation/reduction. For example, the one or more redox molecules may be chosen to create a protective or passivating layer on one or both electrodes to protect and/or stabilize the electrodes during later battery operation. Alternatively, the redox molecules may form solid, liquid or gaseous species that are beneficial for the performance of the battery or the electrochemical water desalination device disclosed herein.

The system may include one or more valves to introduce the gaseous, liquid, gel, or solid sacrificial compound from the water stream to the battery, to flush out reaction products from the system, or both. The device may include one or more inlet valves, one or more outlet valves, or a combination thereof. The activation strategy involving the valves may include the following steps: one or more soluble sacrificial compounds A may be added to a water reservoir from which they are transported via pipes or inlet channels to the electrochemical water cleaning device. Once the sacrificial compounds reach the water cleaning device, at least one inlet and at least one outlet valve of the device may be closed such that stationary conditions are maintained in the device. In other words, there is no water flow while the sacrificial compounds are present in the device.

The valves may be two-way valves or three-way valves. The valves may allow temporary halt of water flow, reverse water flow, emergency drainage of the system, purging, water release from the system, or a combination thereof. The valves enable the system to temporarily become a closed system in which the herein-described activation process may take place. The valves may be the valves 126 described above.

The concentration of the sacrificial compound A may be chosen such that the amount of the sacrificial compound A in the device volume under stationary conditions (moles of compound or compounds A in water) corresponds to the amount of ions B to be intercalated or de-intercalated from the electrodes. If the sacrificial redox reaction proceeds in a one electron reaction and the intercalated ions are monovalent, the moles of A and B are identical, $n_A=n_B$. Generally, the relation should be $z_B n_A=z_A n_B$, where $z_A$ and $z_B$ refer to the valence of the sacrificial compounds A and intercalated ions B, respectively.

The activation process may be performed in a closed system, for example by means of valves. Alternatively, the activation process may be performed in a non-stationary mode where the sacrificial compound(s) A and reaction products are constantly flushed through the electrochemical water cleaning device. Activation may be also performed in a partially or temporarily closed system. Some of the activation strategies described herein such as rebalancing may be performed after operation of the battery in a closed or open system.

The system may also include one or more vents 132 capable of releasing gas generated from oxidation/reduction processes. The vents 132 may be resealable. The valves 126, the vents 132, or both may be operated manually or by the controller 130 described above.

Additionally, the system may include one or more additional reservoirs 123 connected via pipes or channels to the battery 100 and include one or more valves 126 supplying a medium to adjust and/or control pH of the system during the activation step. For example, the medium may include one or more acids or one or more bases compatible with water treatment. The introduction of the pH-adjusting medium may facilitate oxidation/reduction reactions and lower the required overpotential needed to drive the reactions associated with the added sacrificial compound A described above. The pH-adjusting medium may be introduced to the system as an individual stream or multiple streams such that each compartment has its own inlet for the pH-adjusting medium. The multi-stream configuration allows for the medium to be introduced only to one compartment while the second compartment may remain free or substantially free of the medium. Alternatively, a second reservoir with a different medium and a separate channel, valve, and/or inlet may be provided for the second compartment. The medium in the second reservoir and compartment may differ from the medium in the first reservoir and compartment. The first and second medium may differ in chemical composition, concentration, temperature, additional chemical or physical properties, or a combination thereof.

The operation of the electrochemical water desalination system may also include a reactivation or rebalancing strategy to equilibrate the capacities during the device operation to compensate for drift in electrode capacities (aged conditions in FIG. 2). In time, typically, one or both electrodes' shuttling capacity may decrease. If for example one of the electrodes still holds ions at a state-of-charge (SOC) of 30%, while the other one is completely full such as at a SOC of 100%, the device cannot function at full capacity since only 70% of the total charge can be shifted. To resolve this situation, parasitic reactions as described above including the one or more sacrificial compounds may be driven to de-intercalate ions from one electrode without intercalation of ions to the other electrode or vice versa. The SOC balance between the electrodes can be reset or rebalanced to a desired value, such as 0%/100% or 50%/50%. Specifically, the rebalancing may be achieved by dosing one or more sacrificial compounds A to the water stream, by driving respective side reactions mentioned above, by incorporating the one or more sacrificial compounds A into the electrode slurry during manufacture as long as at least some of the one or more sacrificial compounds A remain in the electrode body after initial activation and any prior rebalancing, or a combination thereof.

An additional activation strategy besides including a sacrificial compound and utilization or oxidation/reduction reactions may include providing chemically delithiated electrodes during manufacturing of the electrodes prior to inclusion of the electrodes in the battery electrodes or electrochemical water cleaning device described herein. For example, production of the electrode may include a chemical step including delithiation such that one electrode is fully delithiated having 100% shuttling capacity or room/space to accept intercalation ions at the device operation. The second electrode may be fully lithiated or at about 0% shuttling capacity. Alternatively, both electrodes may be designed during production to have shuttling capacity between about 0 and 100% such as both electrodes may be at about 50% shuttling capacity at the time of battery assembly. Delithiation thus becomes part of the manufacturing process instead of the first step of the battery operation.

Alternatively still, a hybrid deionization (HDI) device with one capacitive and one insertion electrode may be subjected to the activation steps and techniques described above. The device may include one cation intercalation host electrode coupled with a carbon-based electrode on the other side to adsorb anions from water. The carbon-based electrode may include porous carbon, activated carbon, etc. The hybrid device may be "activated" by extracting cations from the intercalation host electrode since the carbon-based counter electrode is naturally in the discharged state when the cell is first assembled. For this process, the same techniques may be applied as described herein.

In one or more embodiments, a method of activating the battery or desalination device described herein is provided. The method includes activating the battery electrodes. The method may include either partially or completely filling one electrode with alkali metal and completely or partially emptying the second electrode of alkali metal. The filling and emptying, respectively, may result in a configuration where one electrode is at about 100% ion shuttling capacity and the second electrode is at about 0% shuttling capacity. Alternatively, the SOC balance may be different such as about 50%/50% as was described above. The method may include increasing or decreasing shuttling capacity of the electrodes by one or more processes described herein.

The method may include activating the electrodes by providing one or more sacrificial compounds A into the battery system as described above in (a)-(e). The method may include using one or more sacrificial compounds A while applying voltage. The method may include using pure water or water with one or mode dissolved solids in the water as the sacrificial compound A. The method may utilize oxidation and/or reduction reactions. The method may utilize one or more sacrificial compounds A with higher or lower reduction potentials than the electrode. The method may include adding one or more small redox molecules to the system.

The method may include providing the one or more sacrificial compounds A into one or both compartments. The compartment into which the one or more sacrificial compounds A may be added may be the compartment with the electrode which is or is to be partially or completely filled with alkali metal such that the electrode is at about 0% shuttling capacity. The compartment into which the one or more sacrificial compounds A may be added may be the compartment with the electrode which is or is to be partially or completely free of alkali metal such that the electrode is at about 100% shuttling capacity.

The method may include providing the one or more sacrificial compounds A into the system via a water stream, one or more pipes, inlets, channels, via one or more valves, the like, or a combination thereof. The method may include providing the one or more sacrificial compounds into the system via one or more streams, pipes, inlets, channels, valves, the like, or a combination thereof. The method may include adding one or more sacrificial compounds A as a gas, liquid, gel, solid, or a combination thereof via one or more routes described above. The method may include introducing one or more sacrificial compounds A which are already dissolved, soluble, or insoluble in the water of the battery system.

Alternatively, the method may include incorporating the one or more sacrificial compounds into the electrode slurry during manufacturing such that the electrode already contains the sacrificial compound(s) when the system is constructed. The method may then include providing potential of the working electrode which releases the one or more sacrificial compounds A into the system to achieve the desired or predetermined intercalation and/or de-intercalation changes within the electrodes.

The method may include removing products of the oxidation, reduction reactions from the battery system, for example via one or more vents, outlets, via one or more valves, the like, or a combination thereof. The method may include leaving the reaction products in the system.

The method may include activating the system while the system is a closed system. Alternatively, the method may include activating the electrodes while the system is an open system. The method may include flushing reactions products out of the battery continuously or discontinuously.

The method may include adjusting pH of the system by providing one or more pH-adjusting media, supplied to the system via one or more streams.

Alternatively, the method may include activating the battery by delithiating the electrodes during manufacturing processes such that the electrodes are manufactured with the desired or predetermined capacity.

The method may include operating the battery as was described above and during the operation, reactivating or rebalancing one or both electrodes to achieve a desired or predetermined shuttling capacity.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of activating a desalination battery working intercalation electrode, the method comprising:
    providing a desalination battery including:
        a working intercalation electrode and a counter intercalation electrode, each electrode arranged in a separate compartment including saline water solution with an elevated concentration of dissolved salts; and
        an ion exchange membrane arranged between the compartments;
    prior to operation of the battery, in a closed state with no water flow,
        activating the desalination battery working intercalation electrode by applying a predetermined voltage to the working intercalation electrode to either (a) de-intercalate ions from the working intercalation electrode into a counter intercalation electrode compartment such that the working intercalation electrode's ion shuttling capacity increases or (b) intercalate ions to the working intercalation electrode from the counter intercalation electrode compartment to decrease an ion shuttling capacity of the working intercalation electrode; and
        reducing or oxidizing a sacrificial compound to neutralize charge in one of the compartments during the activating, the sacrificial compound being consumable and excluding pure water, wherein the sacrificial compound comprises one or more non-recycled compounds that are consumed and removed from the desalination battery during the activation.

2. The method of claim 1, wherein the sacrificial compound comprises one or more solid redox molecules configured as part of the working intercalation electrode.

3. The method of claim 1, further comprising releasing reduction or oxidation reaction products of the sacrificial compound from the desalination battery via at least one vent.

4. The method of claim 1, further comprising conveying the sacrificial compound to one of the compartments via at least one valve.

5. The method of claim 1, further comprising increasing the ion shuttling capacity from pre-activation capacity of about 50% or less to about 100%.

6. The method of claim 1, further comprising adjusting pH in one of the compartments by adding a pH-adjusting medium to at least one of the compartments.

7. The desalination battery of claim 1, further comprising generating sacrificial oxidation/reduction products to form a protective layer on the working and/or counter intercalation electrode(s) to stabilize the electrode(s) for battery operation.

8. A method of desalination battery activation of a battery having electrodes, the method comprising:
    achieving a state of charge balance electrode configuration of about 100%/0% by rebalancing an ion shuttling capacity of the electrodes, each electrode arranged in a separate compartment including a saline water solution, by applying a predetermined voltage to the electrodes to release ions from one or more of the electrodes to the solution or attract ions from the solution to one or more of the electrodes in a pre-operation, closed state with no water flow;
    providing at least one sacrificial compound to be reduced or oxidized while neutralizing charge created by the voltage application, wherein the at least one sacrificial compound comprises one or more non-recycled compounds that are consumed and removed from the battery during the activation; and
    releasing activation reaction products of the at least one sacrificial compound from the desalination battery before desalination operation is initiated.

9. The method of claim 8, wherein the sacrificial compound comprises one or more solid, soluble, or dissolved redox molecules.

10. The method of claim 8, wherein the releasing of the activation reaction products is conducted via at least one vent, and the at least one sacrificial compound is conveyed to the separate compartment via at least one valve.

11. The method of claim 8, wherein the at least one sacrificial compound has a higher reduction potential than a working electrode potential in its partially or fully intercalated state.

* * * * *